(12) United States Patent
Weis

(10) Patent No.: US 12,476,553 B2
(45) Date of Patent: Nov. 18, 2025

(54) CHARGING CURRENT METHOD, CHARGING CURRENT DEVICE, AND ELECTRONIC CONVERTER WITH THE CHARGING CURRENT DEVICE

(71) Applicant: Siemens Aktiengesellschaft, Munich (DE)

(72) Inventor: Benno Weis, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/568,546

(22) PCT Filed: May 5, 2022

(86) PCT No.: PCT/EP2022/062109
§ 371 (c)(1),
(2) Date: Dec. 8, 2023

(87) PCT Pub. No.: WO2022/258265
PCT Pub. Date: Dec. 15, 2022

(65) Prior Publication Data
US 2024/0275296 A1 Aug. 15, 2024

(30) Foreign Application Priority Data

Jun. 11, 2021 (EP) ..................................... 21179053

(51) Int. Cl.
*H02H 3/247* (2006.01)
*H02M 5/458* (2006.01)
(52) U.S. Cl.
CPC .................. *H02M 5/458* (2013.01)

(58) Field of Classification Search
CPC ...................................................... H02M 5/458
See application file for complete search history.

(56) References Cited

U.S. PATENT DOCUMENTS 11,894,675 B2 * 2/2024 Gaudenz .................... H02J 1/14
2012/0147633 A1 * 6/2012 Jones ....................... H02M 5/42
363/37
(Continued)

FOREIGN PATENT DOCUMENTS

DE 102008014645 A1 8/2009
DE 102008036485 A1 2/2010
(Continued)

OTHER PUBLICATIONS

PCT International Preliminary Report on Patentability mailed Jul. 19, 2023 corresponding to PCT International Application No. PCT/EP2022/062109 filed May 6, 2022.

*Primary Examiner* — Rexford N Barnie
*Assistant Examiner* — Esayas G Yeshaw
(74) *Attorney, Agent, or Firm* — Henry M. Feiereisen LLC

(57) ABSTRACT

In a charging current method for limiting a charging current in a DC voltage circuit, the charging current is conducted from an electric supply grid into the DC voltage circuit via diodes. A DC voltage of the DC voltage circuit is ascertained and is based on the supply voltage of the electric supply grid. A variable undervoltage threshold on the DC voltage circuit is determined and a limit of the charging current is activated when the DC voltage reaches or falls below the variable undervoltage threshold.

13 Claims, 5 Drawing Sheets

(56) References Cited

U.S. PATENT DOCUMENTS

| | | | | |
|---|---|---|---|---|
| 2014/0265599 | A1* | 9/2014 | Feng | H02J 5/00 |
| | | | | 307/75 |
| 2015/0236499 | A1* | 8/2015 | Wang | H02M 1/36 |
| | | | | 361/92 |
| 2015/0349681 | A1* | 12/2015 | Liu | H02P 27/06 |
| | | | | 318/400.21 |
| 2016/0204691 | A1 | 7/2016 | Okuda et al. | |
| 2017/0005606 | A1 | 1/2017 | Kuroki | |

FOREIGN PATENT DOCUMENTS

| | | |
|---|---|---|
| DE | 102010025647 A1 | 12/2011 |
| DE | 112014004002 T5 | 5/2016 |
| DE | 102016007785 A1 | 1/2017 |
| EP | 2642652 A1 | 9/2013 |
| EP | 3379675 A1 | 9/2018 |

* cited by examiner

CHARGING CURRENT METHOD, CHARGING CURRENT DEVICE, AND ELECTRONIC CONVERTER WITH THE CHARGING CURRENT DEVICE

CROSS-REFERENCES TO RELATED APPLICATIONS

This application is the U.S. National Stage of International Application No. PCT/EP2022/062109, filed May 5, 2022, which designated the United States and has been published as International Publication No. WO 2022/258265 A1 and which claims the priority of European Patent Application, Serial No. 21179053.0, filed Jun. 11, 2021, pursuant to 35 U.S.C. 119 (a)-(d).

BACKGROUND OF THE INVENTION

The invention relates to a charging current method for limiting a charging current in a DC voltage circuit, wherein the charging current is conducted from an electric supply grid into the DC voltage circuit via diodes. The invention further relates to a charging current device and an electric converter with the charging current device.

In electric converters, such as frequency converters with an intermediate DC link voltage circuit for drive or power supply systems, for example, it is often inherent in the system that following a brief power failure of the supply grid, i.e. a voltage failure accompanied by a reduction or total collapse of the supply voltage of the supply grid, and subsequent, in most cases immediate, power recovery, associated with the return of the supply voltage of the supply grid, a high current, also referred to as a charging or recharging current, flows through the diodes, in this case rectifier diodes, which are mostly operated in a bridge circuit, of the rectifier connected to the supply grid into the DC voltage circuit of the frequency converter with its connected electricity-consuming loads. In most cases the supply voltage is an AC voltage and the corresponding supply grid an AC grid, possibly embodied as a three-phase network.

This behavior can also be observed in principle in the case of DC-to-DC converters, in which a DC voltage of a DC voltage supply grid is converted via a coil or a converter-transformer for example in a known manner by means of suitable diodes into a higher, lower or inverted voltage level of a DC voltage for a DC voltage circuit.

The charging current flowing in the case described can thermally overload the diodes in the process, thereby threatening to damage or permanently destroy them. A meaningful variable for this purpose for a safe or an at-risk operation of the diodes or other electrical components is the integral—also referred to as the limit load integral—over the square of the current in the DC voltage circuit or the current in the supply grid i²t according to the formula $$\int_0^{r1} i^2 dt.$$

As regards the question of whether a safe or an at-risk operation is at hand, the variation of the current i is initially of secondary importance. The limit load integral is linked via an ohmic resistance R of the electrical component that is awaiting consideration, in this case the diode as a semiconductor component, in relation to a consumed energy E according to the following formula $$E = R * \int_0^{r1} i^2 dt.$$

Moreover, the resistance R is temperature-dependent and the consumed energy E leads, as a function of a mass m and a specific heat capacity c of an electrically active zone on the wafer or on the die of the semiconductor component, to a temperature rise ΔT according to the formula $$\Delta T = \frac{E}{m * c}.$$

Starting from a given initial temperature, a temperature that is damaging to the semiconductor component can be reached if the limit load integral is exceeded. The speed at which a corresponding limit temperature can be reached is determined by the magnitude of the current in the semiconductor component. If the current flow is relatively low, at least a portion of the resulting thermal loss can be dissipated to the environment. In addition, the limit load integral is subject to conditions, such as the integration time, for example.

For a diode used in this context, the maximum permissible $i^2t$ value is determined by the forward characteristic and the cross-sectional area of the diode.

In detail, the magnitude of the $i^2t$ value that occurs for example during recharging by means of the charging current via the diodes of a bridge circuit of a rectifier in the DC voltage circuit can be dependent on a variety of electrical variables.

A voltage difference thus results for example between the peak amplitude of a returning supply voltage of the supply grid or a returning DC voltage on the DC voltage circuit and the DC voltage that has decreased during the voltage failure in the DC voltage circuit. In this case the voltage difference increases the longer the voltage drop lasts, the $i^2t$ value of the charging current following voltage recovery also increasing as a function of the voltage difference.

A critical case for the magnitude of the charging current during recharging is present for example if the DC voltage on the DC voltage circuit has dropped to a value immediately above a statically specified undervoltage threshold.

If the DC voltage then increases following voltage recovery, it is possible that an excessively high charging current may also flow due to the high voltage difference, and the it value of the limit load integral may exceed the permissible limit value for the diodes through which the charging current flows on the DC voltage circuit. It is thus possible that the diodes will be destroyed or permanently damaged due to thermal overload.

The undervoltage threshold is in this case a value referred for example to the DC voltage on the DC voltage circuit, which value is specified statically when configuring the components operated on the DC voltage circuit, such as the diodes.

This means that the undervoltage threshold for the operation of the electrical components on the DC voltage circuit is not changed but is often configured once in the course of specifying the general conditions for the electrical activities on the DC voltage circuit prior to putting the diodes and the other electrical components on the DC voltage circuit into operation.

If the DC voltage on the DC voltage circuit falls further below the statically specified undervoltage threshold, a precharging circuit having a corresponding precharging function for limiting the charging current upon voltage recovery will be switched on in addition in most cases.

The grid impedance in particular of the supply grid also has an effect on the magnitude of the $i^2t$ value of the limit load integral for the charging current during recharging.

An electrical capacitance is often driven on the DC voltage circuit or line capacitances are present for example which, whether technically intended or even unwanted, are recharged by means of the charging current following voltage recovery in the event of voltage failure of the supply grid. These capacitances likewise have an impact on the magnitude of the $i^2t$ value of the limit load integral for the charging current. This applies in particular also to a DC link capacitance on the intermediate DC link voltage circuit of a frequency converter.

In drives with multiaxis systems for machine tools or production machines, for example, the capacitance on the intermediate DC link voltage circuit of the frequency converter is dependent on the user's drive configuration. Thus, the charging current for the recharging of the DC link capacitance on the intermediate DC link voltage circuit increases with the increase in the DC link capacitance and the $i^2t$ value of the limit load integral also increases.

The undervoltage threshold that is to be configured statically is set up in this context in such a way that it lies below a minimum value of the intermediate DC link voltage on the intermediate DC link voltage circuit so that in the event of a minimum supply voltage of the supply grid, the specified normal, fault-free operation of the frequency converter is still permitted.

According to a conventional prior art practice, the $i^2t$ value of the limit load integral for the diodes on a DC voltage circuit for example is configured to take account of the worst-case operating scenario, wherein the following parameters are assumed:

The maximum occurring supply voltage of the supply grid or the maximum occurring DC voltage of the DC voltage circuit for normal, fault-free operation of the DC voltage circuit that is still within specification determines a maximum permissible upper tolerance threshold for the corresponding voltage.

The minimum occurring DC voltage on the DC voltage circuit for normal, fault-free operation of the DC voltage circuit that is still within specification is practically identical to the statically configured undervoltage threshold.

The capacitance on the DC voltage circuit must be assumed at a maximum permissible value irrespective of a lower capacitance that, from the user's perspective, is actually required in operation.

A result of this approach is that in order to configure the $i^2t$ withstand capability for electrical components, such as the diodes for a rectifier mode of operation of a frequency converter for example, a maximum and in addition static voltage difference is determined on account of the undervoltage threshold that is to be configured statically. This has the disadvantage that it is consequently necessary to make use of large-area diodes that are overdimensioned and therefore expensive for the majority of applications.

Although it is also possible to limit the maximum permissible capacitance in order to avoid the use of expensive diodes, this imposes constraints on users for example in terms of their required drive configuration of multiaxis systems in the case of machine tools or production machines.

The object underlying the invention is to propose a charging current method, a charging current device and an electric converter with the charging current device which limits a charging current for a DC voltage circuit in the case of voltage recovery following a voltage failure in a manner that represents an improvement compared to the prior art.

SUMMARY OF THE INVENTION

The object is achieved by a charging current method as set forth hereinafter, by a charging current device as set forth hereinafter, and by an electric converter as set forth hereinafter.

In order to achieve the object, a charging current method for limiting a charging current in a DC voltage circuit is proposed, wherein the charging current is conducted from an electric supply grid into the DC voltage circuit via diodes, having the steps of: ascertaining a DC voltage on the DC voltage circuit, said DC voltage being dependent on a supply voltage of the electric supply grid, determining a variable undervoltage threshold on the DC voltage circuit, and activating the limiting of the charging current if the DC voltage reaches or falls below the variable undervoltage threshold.

The charging current method is particularly suitable for driving the diodes in a rectifier mode of operation, wherein said diodes are driven by means of a bridge circuit arrangement in most cases.

During the normal operation of the DC voltage circuit according to specification, thus for the rectifier mode of operation of the diodes on the DC voltage circuit, a variable undervoltage threshold is advantageously implemented in order to protect in particular the diodes but also other electrical components which are operated on the or by means of the DC voltage circuit.

By means of this variable undervoltage threshold it is now possible, following a voltage failure or drop in voltage with subsequent voltage recovery of the supply voltage of the electric supply grid, and consequently of the DC voltage on the DC voltage circuit, to adjust the charging current for recharging the DC voltage circuit and the energy-consuming loads associated therewith, such as an electrical load driven via an inverter on the DC voltage circuit for example, in an efficient and application-oriented manner to match the electrical conditions on the DC voltage circuit, in contrast to known charging current methods having only an undervoltage threshold that has to be configured statically.

This means that the charging current for recharging the DC voltage circuit upon voltage recovery after the voltage failure can be significantly reduced compared with the prior art solution in which it is necessary to configure the static undervoltage threshold in an inflexible manner, intended for maximum electrical requirements of the DC voltage circuit. The electrical components to be used on the DC voltage circuit, such as in particular the diodes, can advantageously be selected with regard to their electrical operating data both from the cost perspective and also from the viewpoint of a reducible installation space requirement for their use for example in electric converters.

Advantageous embodiments of the charging current method are set forth in the dependent claims.

A first advantageous embodiment of the charging current method has the step of forming a voltage difference between the DC voltage and the variable undervoltage threshold, wherein the voltage difference remains unchanged irrespective of the value of the DC voltage.

According to the invention it is important to keep the voltage difference as small as possible so that in order to overcome the voltage difference, the charging current flowing on the DC voltage circuit following a voltage failure or drop in voltage with subsequent voltage recovery of the supply voltage of the electric supply grid, and consequently of the DC voltage on the DC voltage circuit, establishes the $i^2t$ withstand capability of the limit load integral for in particular the diodes compared to the conventional solution and this also after the DC voltage drops to a value close to the minimum DC voltage that is still permissible for normal, fault-free operation of the DC voltage circuit within specification.

To ensure the voltage difference advantageously remains unchanged irrespective of the value of the ascertained DC voltage, the variable undervoltage threshold can be set to an absolute constant voltage value below the ascertained DC voltage of the DC voltage circuit. However, it is necessary for the variable undervoltage threshold to remain greater than the minimum DC voltage that is still permissible for normal, fault-free operation of the DC voltage circuit within specification.

A further advantageous embodiment of the charging current method has the step of forming a voltage difference between the DC voltage and the variable undervoltage threshold, wherein the voltage difference varies as a function of the value of the DC voltage.

In order to couple the voltage difference variably to the value of the DC voltage in an advantageous manner, the variable undervoltage threshold can be set below the DC voltage as a percentage value relative to the magnitude of the ascertained DC voltage of the DC voltage circuit, 20% of the DC voltage proving particularly advantageous. Accordingly, the voltage difference is sufficiently small to maintain the $i^2t$ withstand capability of the limit load integral in order to provide protection against an excessively high charging current in particular for the diodes, although in the event of a very brief and relatively small voltage sag, the variable undervoltage threshold is not reached prematurely.

The undervoltage threshold should nonetheless remain greater than the minimum DC voltage that is still permissible for normal, fault-free operation of the DC voltage circuit within specification.

In a further advantageous embodiment of the charging current method, an electrical precharging of the DC voltage circuit and/or a reduction in energy extraction on the DC voltage circuit are/is activated in order to limit the charging current.

The limiting of the charging current comes into effect on the DC voltage circuit when, with the recovery of the voltage following the voltage drop or voltage failure, the recharging of the DC voltage circuit by means of the charging current commences.

Further, the electrical precharging by means of a precharging circuit on the DC voltage circuit can limit the charging current. In most cases precharging circuits of said type have a precharging resistance which is switched into the DC voltage circuit for the electrical precharging function.

The reduction in energy extraction in order to limit the charging current on the DC voltage circuit can advantageously be implemented by disconnecting electricity-consuming loads from the DC voltage circuit. This also includes for example an inverter that is connected to the DC voltage circuit and drives an electric machine. In this case the inverter will suspend supplying power to the electric machine.

In a further advantageous embodiment of the charging current method, the variable undervoltage threshold is determined as a function of a capacitance on the DC voltage circuit.

For electric drives in the case of multiaxis systems, for example, the varying capacitance on the intermediate DC link voltage circuit according to the task in hand can be taken into account by frequency converters and the undervoltage threshold can advantageously be adjusted to match the relevant drive configuration; in particular, in contrast to known solutions, a total capacitance being applied on the DC voltage circuit can be increased without the charging current on the DC voltage circuit causing damage to the electrical components, such as in particular the diodes, following a drop in voltage or voltage failure with voltage recovery.

When a greater capacitance is applied on the DC voltage circuit, the variable undervoltage threshold is increased relative to the ascertained DC voltage and accordingly moved closer to the ascertained DC voltage, whereas when a smaller capacitance is applied on the DC voltage circuit, the variable undervoltage threshold is reduced relative to the ascertained DC voltage and consequently moved further away from the ascertained DC voltage.

In a further advantageous embodiment of the charging current method, the variable undervoltage threshold is determined as a function of a grid impedance on the electric supply grid.

The grid impedance is ascertained according to known grid identification methods, for example in the case of an active infeed converter with backward diodes. In the case of a small grid impedance of the electric supply grid, the variable undervoltage threshold is advantageously increased relative to the ascertained DC voltage and consequently moved closer to the ascertained DC voltage, whereas in the case of a large grid impedance of the electric supply grid, the variable undervoltage threshold is advantageously reduced relative to the ascertained DC voltage and consequently moved further away from the ascertained DC voltage.

In a further advantageous embodiment of the charging current method, the variable undervoltage threshold is determined if the DC voltage increases over a specific time period.

If the variable undervoltage threshold is updated in that instant when the ascertained DC voltage drops following a voltage failure, the variable undervoltage threshold would drop to the same extent as the ascertained DC voltage. A reaching and undershooting of the variable undervoltage threshold possibly desired in this case would therefore be scarcely possible.

An increase in the ascertained DC voltage for determining or updating the variable undervoltage threshold over the specific time period is present if an increase in the averaged DC voltage or the enlargement of an envelope of the ripple DC voltage—based on the AC voltage of the supply voltage—occurs over the specific time period.

In a further advantageous embodiment of the charging current method, the variable undervoltage threshold is determined by means of a modulation index of a controller for switchable semiconductors, wherein the diodes are in each case connected into the circuit as backward diodes in parallel with the switchable semiconductors of a bridge circuit and wherein the modulation index is embodied as the quotient of the supply voltage of the electric supply grid and the DC voltage of the DC voltage circuit.

Active infeed converters regulate the voltage value for the DC voltage circuit or the intermediate DC link voltage circuit to a constant setpoint value. In this case the supply voltage of the supply grid, and consequently also a voltage failure or voltage sag, cannot be linked directly in respect of the DC voltage on the DC voltage circuit. Also, the supply voltage of the supply grid is not measured in many cases.

In an active infeed converter, the modulation index for a control set of the semiconductor switches of the active infeed converter is also known in addition to the voltage value of the DC voltage on the DC voltage circuit. Said modulation index describes the relationship in particular of a peak value of the supply voltage of the supply grid and the DC voltage on the DC voltage circuit or intermediate DC link voltage circuit. It is set by a controller of the active infeed converter such that the desired DC voltage is reached on the DC voltage circuit with the available supply voltage of the supply grid.

Also proposed in order to achieve the object is a charging current device for limiting a charging current, having a DC voltage circuit, diodes, which can be connected to an electric supply grid and are connected to the DC voltage circuit, wherein the charging current can be conducted from the electric supply grid into the DC voltage circuit via the diodes, and a processor unit, configured for ascertaining a DC voltage on the DC voltage circuit, said DC voltage being dependent on a supply voltage of the electric supply grid, configured for determining a variable undervoltage threshold on the DC voltage circuit, and configured for activating the limiting of the charging current if the DC voltage reaches or falls below the variable undervoltage threshold.

The charging current device is embodied to perform the steps of the charging current method.

In a first advantageous embodiment of the charging current device, the processor unit is configured for forming a voltage difference between the DC voltage and the variable undervoltage threshold, wherein the voltage difference remains unchangeable irrespective of the value of the DC voltage, or wherein the voltage difference remains variable as a function of the value of the DC voltage.

In a further advantageous embodiment of the charging current device, an electrical precharging of the DC voltage circuit by means of a precharging unit and/or a reduction in energy extraction on the DC voltage circuit can be activated by means of a disconnect unit in order to limit the charging current.

Precharging units find application for example in frequency converters having an intermediate DC link voltage circuit and DC link capacitor on the intermediate DC link voltage circuit. As soon as the charging current starts to flow in the DC voltage circuit after voltage recovery, it can advantageously be limited as a result of the electrical precharging by means of the precharging unit.

The reduction in energy extraction in order to limit the charging current on the DC voltage circuit can advantageously be performed by disconnecting electrical loads from the DC voltage circuit. For this purpose, an electric machine for example is connected to the DC voltage circuit via an inverter. On the one hand the inverter drives the electric machine, but on the other hand is also provided as a disconnect unit for reducing the energy extraction on the DC voltage circuit. In this case the inverter will suspend supplying power to the electric machine.

In a further advantageous embodiment of the charging current device, the processor unit is configured to determine the variable undervoltage threshold as a function of a capacitance on the DC voltage circuit and/or as a function of a grid impedance on the electric supply grid.

In a further advantageous embodiment of the charging current device, the processor unit is configured to determine the variable undervoltage threshold if it can be ascertained by means of an increase checking function that the DC voltage increases over a specific time period.

In a further advantageous embodiment of the charging current device, the processor unit is configured to provide a modulation index of a controller for switchable semiconductors of a bridge circuit in order to determine the variable undervoltage threshold, wherein the diodes are in each case connected into the circuit as backward diodes in parallel with the switchable semiconductors and wherein the modulation index is embodied as the quotient of the supply voltage of the electric supply grid and the DC voltage of the DC voltage circuit.

Also proposed in order to achieve the object is an electric converter with the inventive charging current device, wherein an electric machine can be electrically connected to the DC voltage circuit and can be operated on the electric supply grid via the diodes and the DC voltage circuit.

BRIEF DESCRIPTION OF THE DRAWING

The above-described characteristics, features and advantages of this invention, as well as the manner in which these are realized, will become clearer and more readily understandable in connection with the following description of the exemplary embodiments, which are explained in more detail with reference to the figures, in which.

DETAILED DESCRIPTION OF PREFERRED EMBODIMENTS

Figure 1:
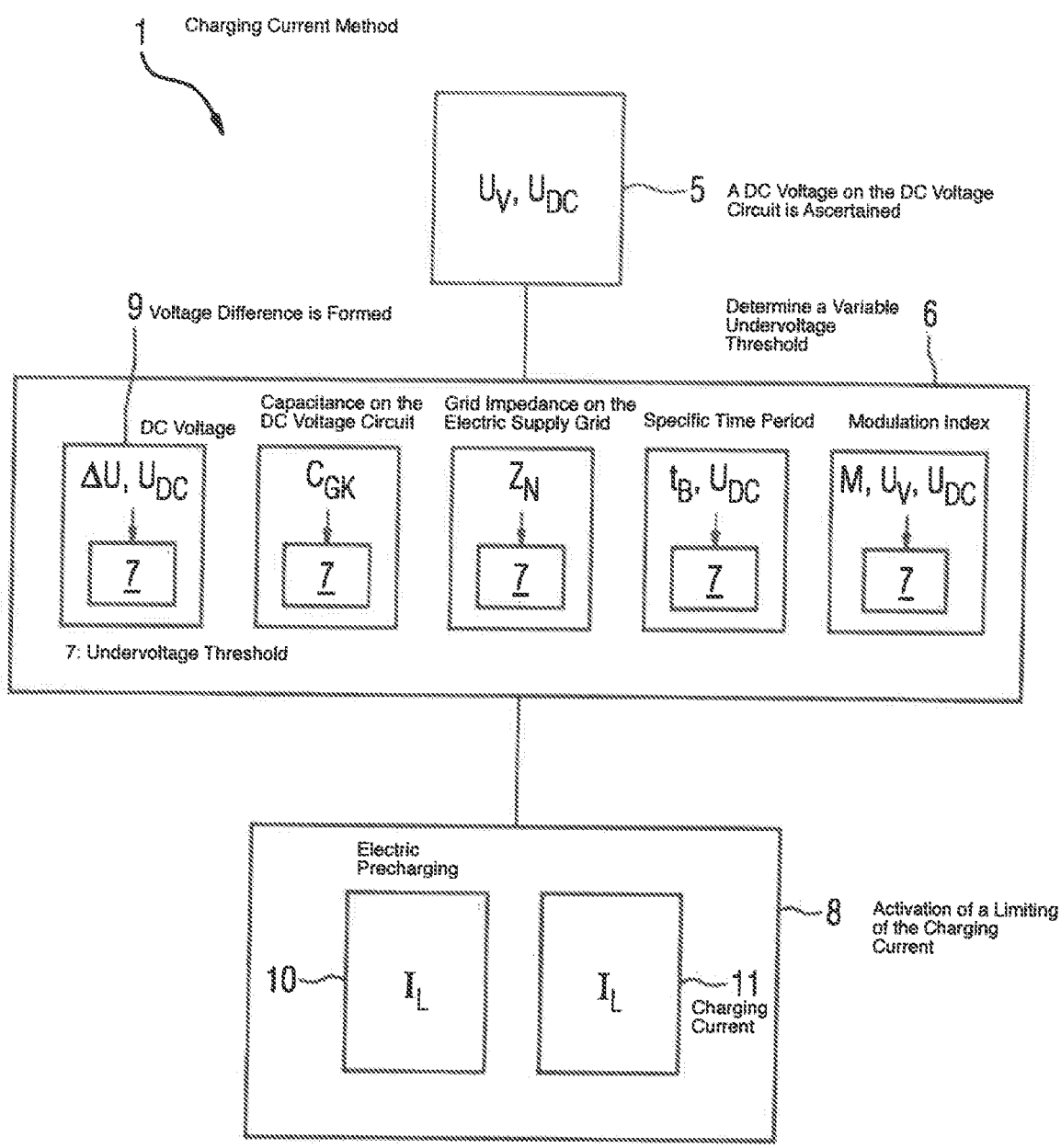
FIG. 1 shows a schematic representation of a structure chart of the inventive charging current method.

FIG. 1 shows a schematic representation of a structure chart of the inventive charging current method 1.

The charging current method 1 limits a charging current $I_L$ in a DC voltage circuit, the charging current $I_L$ being conducted from an electric supply grid into the DC voltage circuit via diodes.

In a first step of the charging current method 1, a DC voltage $U_{DC}$ on the DC voltage circuit is ascertained 5, said DC voltage $U_{DC}$ being dependent on a supply voltage $U_V$ of the electric supply grid. To that end, both the supply voltage $U_V$ on the electric supply grid and the DC voltage $U_{DC}$ on the DC voltage circuit can be measured in each case, but can also be determined or calculated from other electrical variables.

In a further step, a variable undervoltage threshold 7 is determined 6 on the DC voltage circuit.

In order to determine 6 the variable undervoltage threshold 7, a voltage difference ΔU is formed 9 between the DC voltage $U_{DC}$ and the variable undervoltage threshold 7.

Further, the voltage difference ΔU can be formed such that it remains unchanged irrespective of the value of the DC voltage $U_{DC}$.

The voltage difference ΔU can also be formed such that the voltage difference ΔU varies as a function of the value of the DC voltage $U_{DC}$.

The variable undervoltage threshold 7 in the exemplary embodiment according to FIG. 1 can be determined 6 both as a function of a capacitance $C_{GK}$ on the DC voltage circuit and as a function of a grid impedance $Z_N$ on the electric supply grid.

The variable undervoltage threshold 7 is determined 6 only if the DC voltage $U_{DC}$ increases over a specific time period $t_B$.

The variable undervoltage threshold 7 can also be determined 6 by means of a modulation index M of a controller for switchable semiconductors. In this case the diodes are each connected into the circuit as backward diodes in parallel with the switchable semiconductors of a bridge circuit, wherein the bridge circuit can then come into use for example in an active infeed between the supply grid and the DC voltage circuit in the rectifier mode of operation. The modulation index M is in this case embodied as the quotient of the supply voltage $U_V$ of the electric supply grid and the DC voltage $U_{DC}$ of the DC voltage circuit.

The activation of a limiting 8 of the charging current $I_L$ commences if the DC voltage $U_{DC}$ reaches or falls below the variable undervoltage threshold 7. The limiting 8 becomes effective when the charging current starts to flow in the DC voltage circuit following the voltage drop and the voltage recovery.

In FIG. 1, an electric precharging 10 of the DC voltage circuit and a reduction in energy extraction on the DC voltage circuit are activated for the purpose of limiting 8 the charging current $I_L$.

Figure 2:
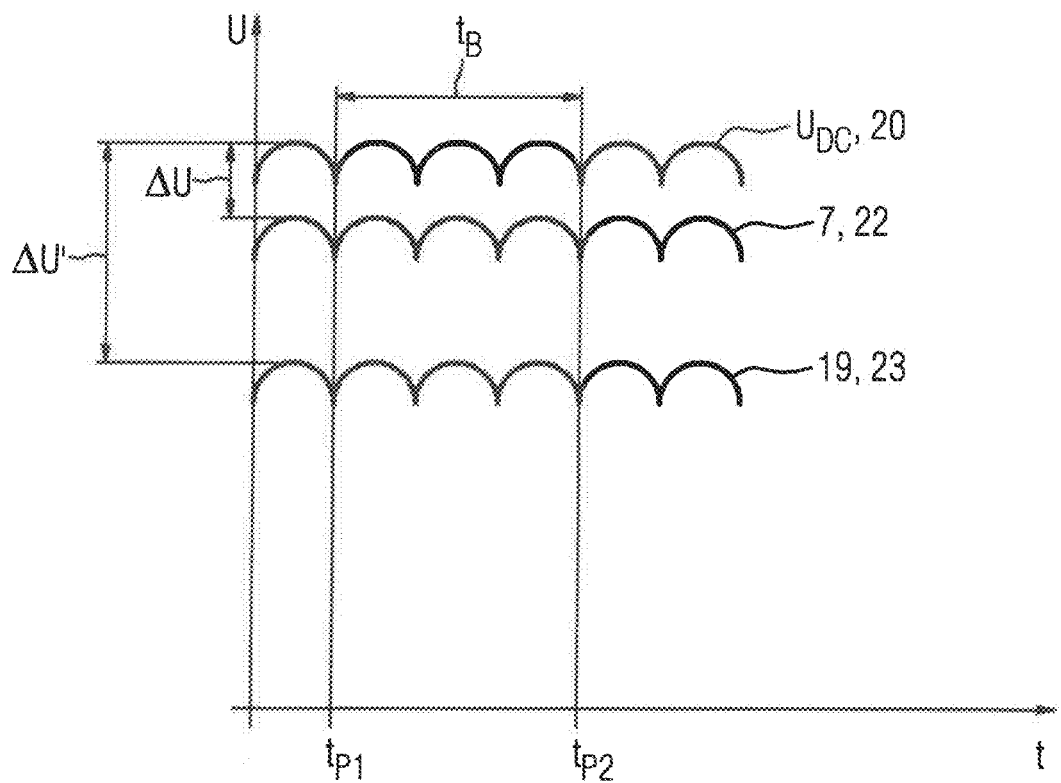
FIG. 2 shows a first schematic representation of a diagram containing a variable undervoltage threshold for the inventive charging current method according to FIG. 1.

FIG. 2 shows a first schematic representation of a diagram containing a variable undervoltage threshold 7 for the inventive charging current method 1 according to FIG. 1.

The diagram has two axes, one axis being labeled with a time t and the other axis with a voltage U.

A DC voltage $U_{DC}$ plotted on the axis of the voltage U as a ripple DC voltage 20 is followed at a spacing of a voltage difference ΔU by the variable undervoltage threshold 7, which is embodied as a variable undervoltage threshold 22 adjusted to match the ripple DC voltage 20.

The DC voltage $U_{DC}$ plotted as a ripple DC voltage 23 on the axis of the voltage U is followed by the static undervoltage threshold 19, which is embodied as a static undervoltage threshold 23 fitted to the ripple DC voltage 20, at a spacing of a further voltage difference ΔU'. It is apparent here that the variable undervoltage threshold 7 of the DC voltage $U_{DC}$ embodied as a ripple DC voltage 20 can follow flexibly at a narrower spacing, wherein the static undervoltage threshold 19 remains unchanged.

A time period $t_B$ stretches between a first time point $t_{P1}$ and a second time point $t_{P2}$. The time period $t_B$ is chosen in this case such that it is shorter than a likely fluctuation in the supply voltage of the supply grid. A time period of 10 ms is proposed as a typical value.

Figure 3:
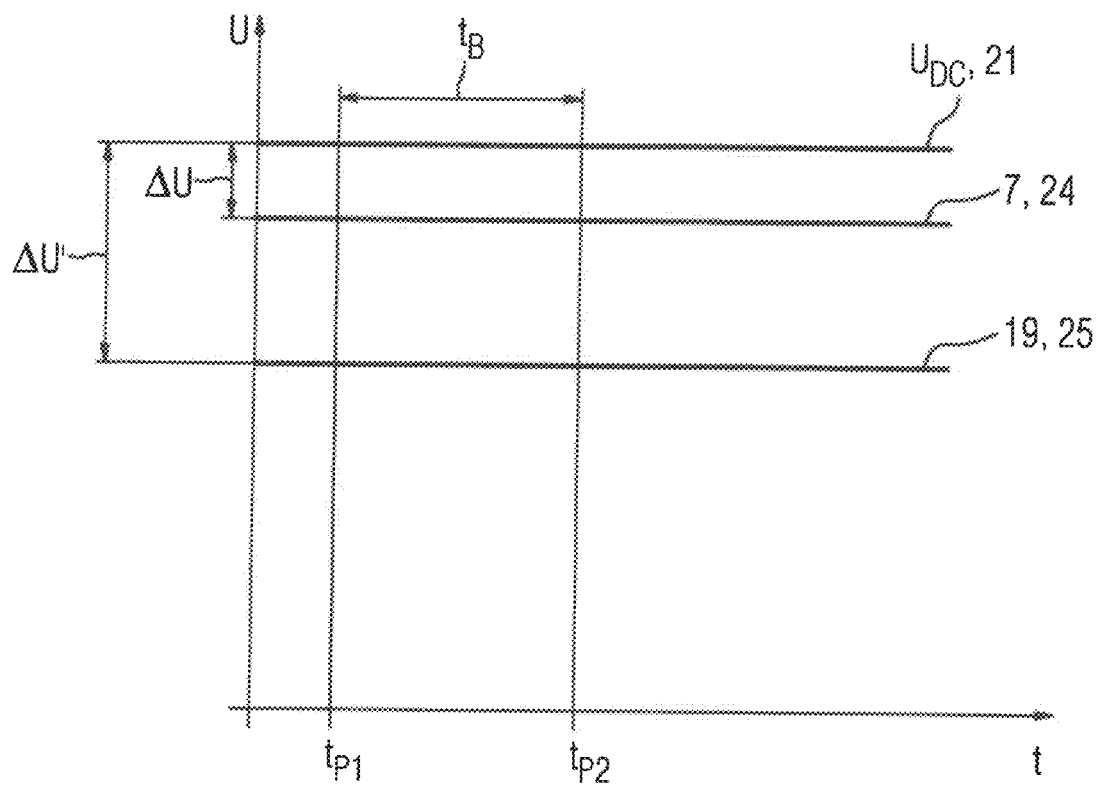
FIG. 3 shows a second schematic representation of a diagram containing an exemplary embodiment of the variable undervoltage threshold according to FIG. 2 for the inventive charging current method according to FIG. 1.

FIG. 3 shows a second schematic representation of a diagram containing an exemplary embodiment of the variable undervoltage threshold 7 according to FIG. 2 for the inventive charging current method 1 according to FIG. 1.

Analogously to the diagram of FIG. 2, the diagram has two axes, one axis likewise being labeled with the time t and the other axis with the voltage U and a time period $t_B$ stretching between the first time point $t_{P1}$ and a second time point $t_{P2}$, as in FIG. 2.

A DC voltage $U_{DC}$ plotted on the axis of the voltage U as an averaged DC voltage 21 is followed at a spacing of the voltage difference ΔU by the variable undervoltage threshold 7, which is embodied as a variable undervoltage threshold 24 adjusted to match the averaged DC voltage 20.

The DC voltage $U_{DC}$ plotted on the axis of the voltage U as an averaged DC voltage 25 is followed at a spacing of the further voltage difference ΔU' by the static undervoltage threshold 19, which is embodied as a static undervoltage threshold 25 fitted to the averaged DC voltage 21. Here in FIG. 3 also it is evident that the variable undervoltage threshold 7 of the DC voltage $U_{DC}$ embodied as an averaged DC voltage 21 can follow flexibly at a narrower spacing, the static undervoltage threshold 19 remaining unchanged.

Both FIG. 2 and FIG. 3 show that the variable undervoltage threshold 7 lies significantly higher and closer to the ascertained DC voltage $U_{DC}$ compared to the conventional static undervoltage threshold 19. Accordingly, the voltage difference ΔU between variable undervoltage threshold 7 and DC voltage $U_{DC}$ is likewise significantly reduced compared to the further voltage difference ΔU'. As a result, the current flow of the charging current starting following the voltage drop and voltage recovery, and consequently the $i^2t$ value, is also significantly reduced compared to the known solution with the static undervoltage threshold 19.

Figure 4:
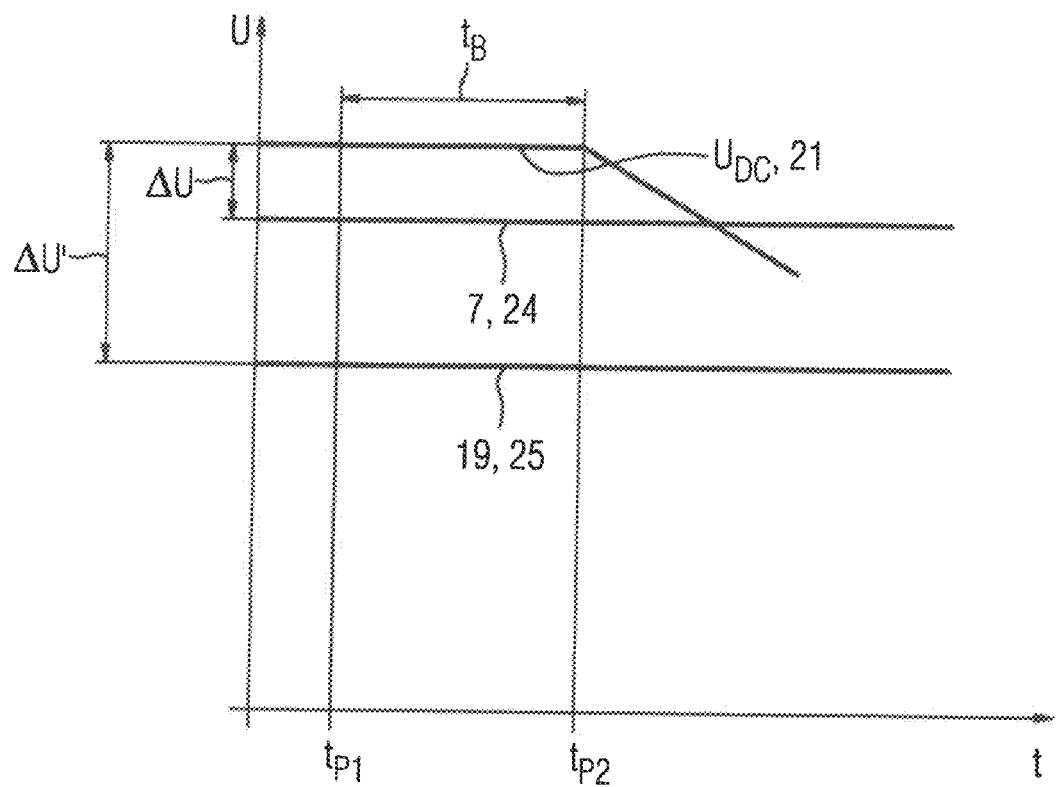
FIG. 4 shows a third schematic representation of a diagram containing the variable undervoltage threshold according to FIG. 2 or FIG. 3 at the time of a voltage failure of a DC voltage on a DC voltage circuit as a function of a voltage failure of a supply voltage of a supply grid for the inventive charging current method according to FIG. 1.

FIG. 4 shows a third schematic representation of a diagram containing the variable undervoltage threshold 7 according to FIG. 3 at the second time point $t_{P2}$ of a voltage failure of a DC voltage $U_{DC}$ on a DC voltage circuit for the inventive charging current method according to FIG. 1.

The diagram of FIG. 4 is to be understood analogously to the diagram of FIG. 3. However, a voltage drop of the DC voltage $U_{DC}$ occurs at the second time point $t_{P2}$, driven by the voltage drop of the supply voltage of the supply grid, wherein the DC voltage $U_{DC}$ reaches and falls below the variable undervoltage threshold 7.

It becomes clear in FIG. 4 that if the variable undervoltage threshold 7 were to be updated further starting from the second time point $t_{P2}$, this would decrease to the same extent as the ascertained DC voltage $U_{DC}$ actually decreases. A reaching and falling below of the variable undervoltage threshold 7 desired in the case of an imminent voltage drop would therefore be scarcely possible.

Accordingly, the undervoltage threshold 7 must be updated when the ascertained DC voltage $U_{DC}$ increases over the time period $t_B$. An increase in the ascertained DC voltage $U_{DC}$ for determining or updating the variable undervoltage threshold 7 over the specific time period $t_B$ is present if an increase in the DC voltage $U_{DC}$, in this case embodied as an averaged DC voltage 21, occurs over the specific time period $t_B$.

Figure 5:
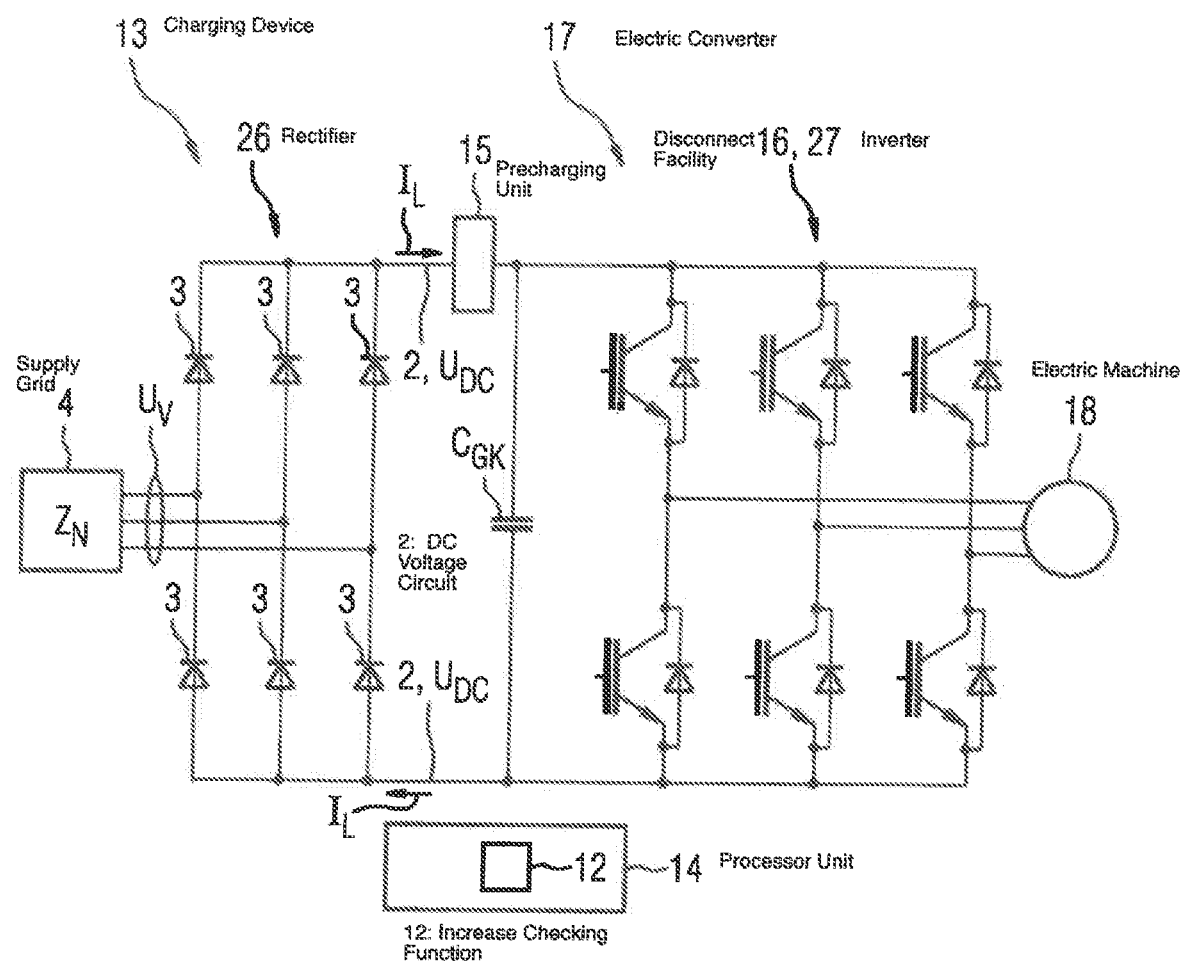
FIG. 5 shows a schematic representation of an inventive electric converter with an inventive charging device for the inventive charging current method according to FIG. 1.

FIG. 5 shows a schematic representation of an inventive electric converter with an inventive charging device for the inventive charging current method according to FIG. 1.

In addition to the charging device 13, the electric converter 17, also shown in more detail here as a frequency converter having a DC voltage circuit 2—also referred to as an intermediate DC link voltage circuit—includes a passive rectifier 26 with diodes 3 which are electrically connected to the DC voltage circuit 2 by means of three bridge branches of a bridge circuit. The rectifier 26 together with its diodes 3 is connected to a supply grid 4, depicted here as a three-phase grid. The supply voltage $U_v$ is applied to the three-phase supply grid 4. The supply grid 4 is also determined by its grid inductance $Z_N$.

An electric machine 18 is electrically connected to the DC voltage circuit 2, in this case via an inverter 27. A capacitance $C_{GK}$, in this case an intermediate DC link voltage circuit capacitance, is also connected to the DC voltage circuit 2. The DC voltage 2 is applied to the DC voltage circuit 2. In the case of voltage recovery following a voltage failure, the charging current $I_L$ flows in the DC voltage circuit 2. It can be limited as a result of an electric precharging by means of a precharging unit 15 or as a result of a reduction in energy extraction by means of a disconnect facility 16—in this case the inverter 27—which isolates the electric machine 18 electrically from the DC voltage circuit 2.

The inventive charging method can furthermore be performed by means of a processor unit 14, the processor unit 14 having an increase checking function 12 for ascertaining the increase or reduction in the DC voltage $U_{DC}$.

The invention claimed is:

1. A charging current method for limiting a charging current in a DC voltage circuit, the charging current method comprising:
   conducting the charging current from an electric supply grid into the DC voltage circuit via diodes;
   ascertaining a DC voltage on the DC voltage circuit, with the DC voltage being dependent on a supply voltage of the electric supply grid;
   determining and updating a variable undervoltage threshold on the DC voltage circuit when the ascertained DC voltage embodied as an averaged DC voltage increases over a time period; and
   activating the limiting of the charging current when the DC voltage reaches or falls below the variable undervoltage threshold.

2. The charging current method of claim 1, further comprising forming a voltage difference between the DC voltage and the variable undervoltage threshold, with the voltage difference remaining unchanged irrespective of the value of the DC voltage.

3. The charging current method of claim 1, further comprising forming a voltage difference between the DC voltage and the variable undervoltage threshold, with the voltage difference varying as a function of the value of the DC voltage.

4. The charging current method of claim 1, further comprising activating an electric precharging of the DC voltage circuit and/or a reduction in energy extraction on the DC voltage circuit in order to limit the charging current.

5. The charging current method of claim 1, further comprising determining the variable undervoltage threshold as a function of a capacitance on the DC voltage circuit.

6. The charging current method of claim 1, further comprising determining the variable undervoltage threshold as a function of a grid impedance on the electric supply grid.

7. The charging current method of claim 1, further comprising:
   determining the variable undervoltage threshold by a modulation index of a controller for switchable semiconductors of a bridge circuit;
   connecting the diodes as backward diodes into the DC voltage circuit in parallel with the switchable semiconductors; and
   embodying the modulation index as a quotient of the supply voltage of the electric supply grid and the DC voltage of the DC voltage circuit.

8. A charging current device for limiting a charging current, the charging current device comprising:
   a DC voltage circuit;
   a plurality of diodes connectable to an electric supply grid and connected to the DC voltage circuit, with the charging current capable of being conducted via the diodes from the electric supply grid Into the DC voltage circuit; and
   a processor unit designed to ascertain a DC voltage on the DC voltage circuit, with the DC voltage being dependent on a supply voltage of the electric supply grid, for determining and updating a variable undervoltage threshold on the DC voltage circuit by an increase checking function when the ascertained DC voltage increases over a time period, and for activating the limiting of the charging current when the DC voltage reaches or falls below the variable undervoltage threshold.

9. The charging current device of claim 8, wherein the processor unit is designed to form a voltage difference between the DC voltage and the variable undervoltage threshold, with the voltage difference remaining unchangeable irrespective of a value of the DC voltage or being variable as a function of the value of the DC voltage.

10. The charging current device of claim 8, further comprising a precharging unit designed to activate an electric precharging of the DC voltage circuit to limit the charging current and/or a disconnect unit designed to activate a reduction in energy extraction on the DC voltage circuit to thereby limit the charging current.

11. The charging current device of claim 8, wherein the processor unit is designed to determine the variable undervoltage threshold as a function of a capacitance on the DC voltage circuit and/or as a function of a grid impedance on the electric supply grid.

12. The charging current device of claim 8, wherein the processor unit is designed to provide a modulation index of a controller for switchable power semiconductors of a bridge circuit in order to determine the variable undervoltage cutoff threshold, wherein the diodes are connected as backward diodes into the DC voltage circuit in parallel with the switchable power semiconductors, and wherein the modulation index is embodied as a quotient of the supply voltage of the electric supply grid and the DC voltage of the DC voltage circuit.

13. An electric converter, comprising:
   a charging current device comprising a DC voltage circuit, a DC voltage circuit, a plurality of diodes connectable to an electric supply grid and connected to the DC voltage circuit, with a charging current capable of being conducted via the diodes from the electric supply grid into the DC voltage circuit, and a processor unit designed to ascertain a DC voltage on the DC voltage circuit, with the DC voltage being dependent on a supply voltage of the electric supply grid, for determining and updating a variable undervoltage threshold on the DC voltage circuit by an increase checking function when the ascertained DC voltage increases over a time period, and for activating the limiting of the charging current when the DC voltage reaches or falls below the variable undervoltage threshold; and an electric machine electrically connectable to the DC voltage circuit and operatable on the electric supply grid via the diodes and the DC voltage circuit.

* * * * *